United States Patent [19]

Arbogast

[11] Patent Number: 5,347,402
[45] Date of Patent: Sep. 13, 1994

[54] MULTIPLE MIRROR ASSEMBLY FOR SOLAR COLLECTOR

[76] Inventor: Porter Arbogast, P.O. Box 5015, Page, Ariz. 86040

[21] Appl. No.: 929,767

[22] Filed: Aug. 12, 1992

[51] Int. Cl.$^5$ ............................................. G02B 5/10
[52] U.S. Cl. .................................... 359/853; 359/850
[58] Field of Search .............................. 359/223–226, 359/838, 844, 847, 849–853, 871–872, 877–882; 126/569–573, 600, 906, 680, 684, 696

[56] References Cited

U.S. PATENT DOCUMENTS

| | | | |
|---|---|---|---|
| 1,111,239 | 9/1914 | Smelser | 359/853 |
| 2,471,954 | 5/1949 | Harvey | 359/853 |
| 4,056,313 | 11/1977 | Arbogast | 353/3 |
| 4,103,672 | 8/1978 | Meyer | 126/604 |
| 4,172,443 | 10/1979 | Sommer | 126/680 |
| 4,229,077 | 10/1980 | Schwab | 359/846 |
| 4,245,895 | 1/1981 | Wildenrotter | 359/848 |
| 4,423,926 | 1/1984 | Stolpin | 359/853 |
| 4,466,423 | 8/1984 | Dolan et al. | 359/853 |
| 4,488,729 | 12/1984 | Varner | 359/853 |
| 4,611,891 | 9/1986 | Dane | 359/853 |
| 4,656,996 | 4/1987 | Aharon | 126/600 |
| 4,682,865 | 7/1987 | Rogers et al. | 359/846 |

Primary Examiner—Loha Ben
Assistant Examiner—Thong Nguyen
Attorney, Agent, or Firm—LaValle D. Ptak

[57] ABSTRACT

A mirror assembly for use with a focusing or concentrating solar collector or the like has rows and columns of individual rectangular mirrors mounted by means of flexible cords passing through eyelets on the edges of each of the mirrors, with the cords secured to an open rectangular frame. The cords are selectively tensioned; and when the cords are under tension, all of the mirrors are maintained in a substantially flat orientation in a plane parallel to the plane of the frame. The frame is secured to the top of a support structure which has mirror mounts located beneath each of the mirrors in the mirror assembly. Magnets are provided of on the side of the mirrors which face the underlying support structure; and when the tension in the cords is released, the mirrors drop into place on top of each of the mirror mounts of the support structure, and are held in place by means of the magnets. The angular orientation of the mirrors then is controlled by the operation of the solar collector mechanism. Subsequent retensioning of the cords overcomes the magnetic attraction of the mirrors to the mirror mounts; and the mirrors are removed from the support structure and held in place on the frame by means of the flexible cords. The entire frame of mirrors then may be removed for subsequent storage or replacement.

18 Claims, 3 Drawing Sheets

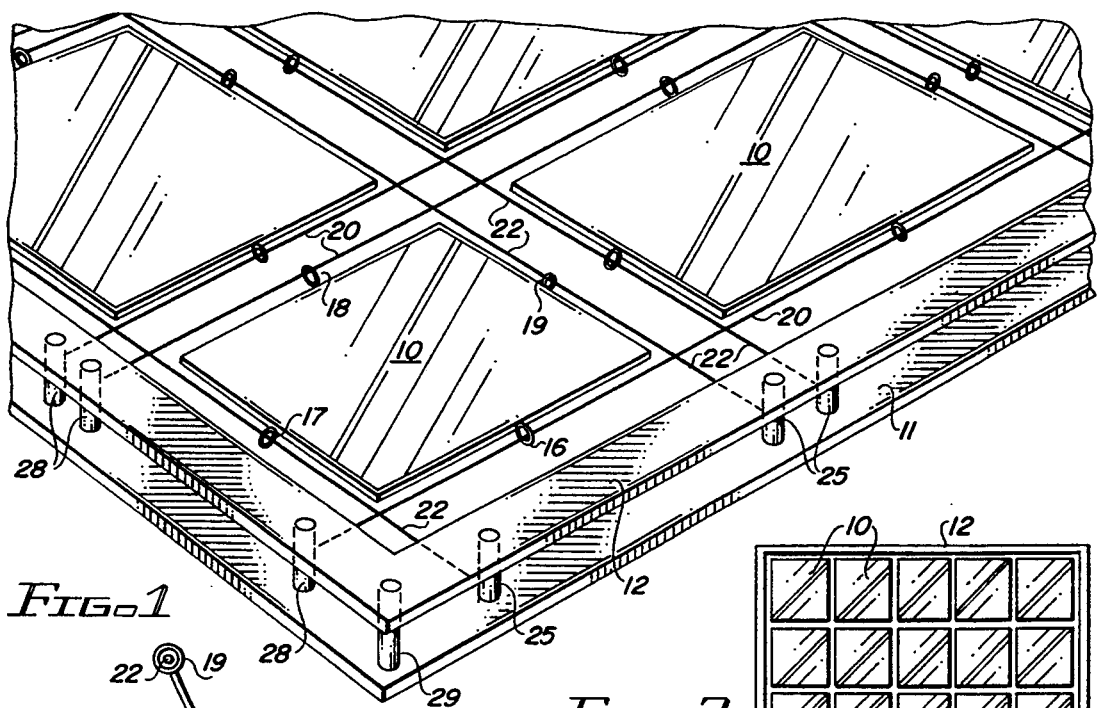
Fig. 1
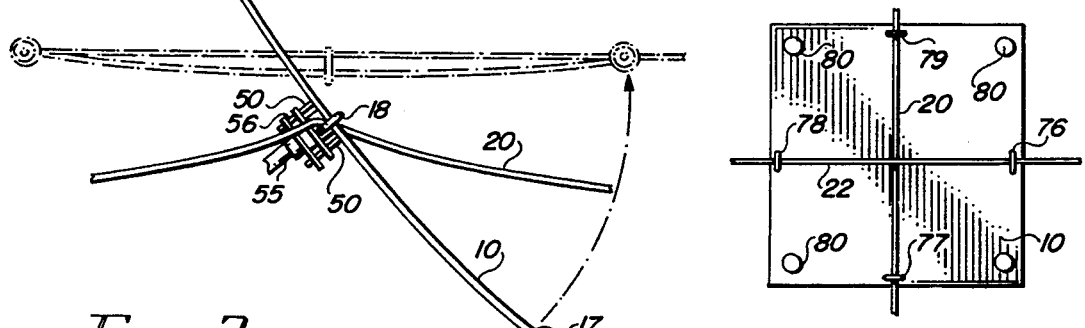
Fig. 2
Fig. 3
Fig. 6
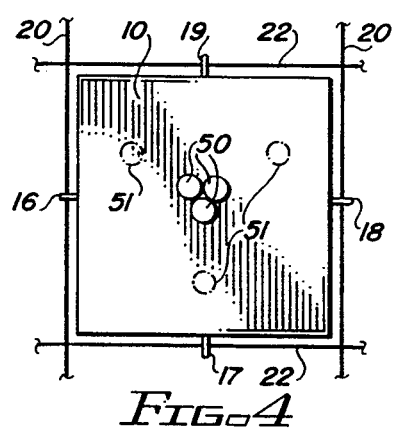
Fig. 4
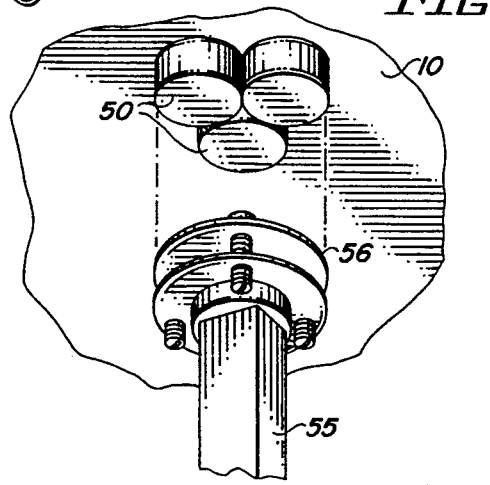
Fig. 5

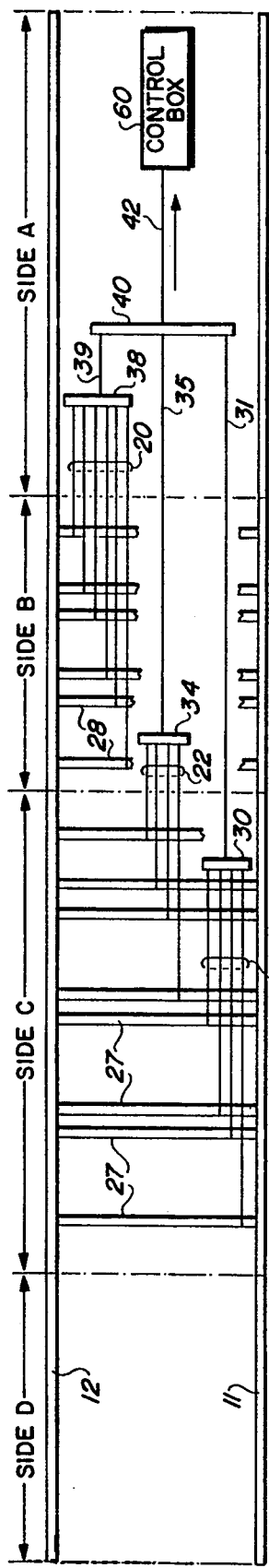
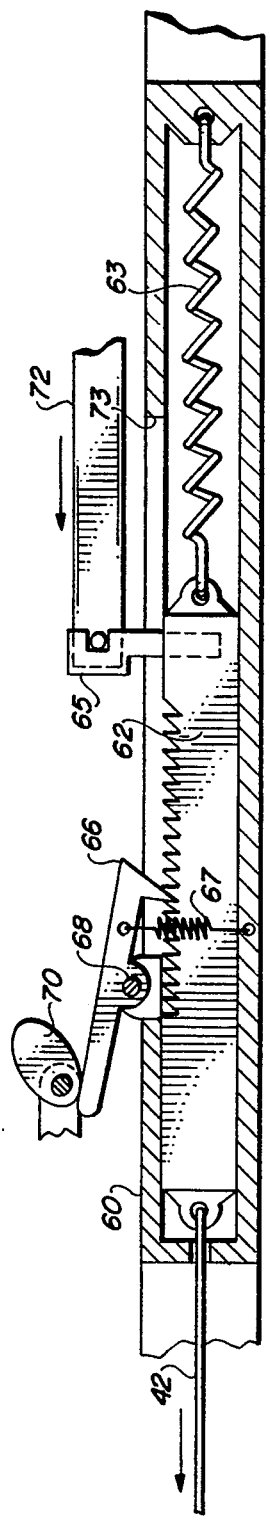
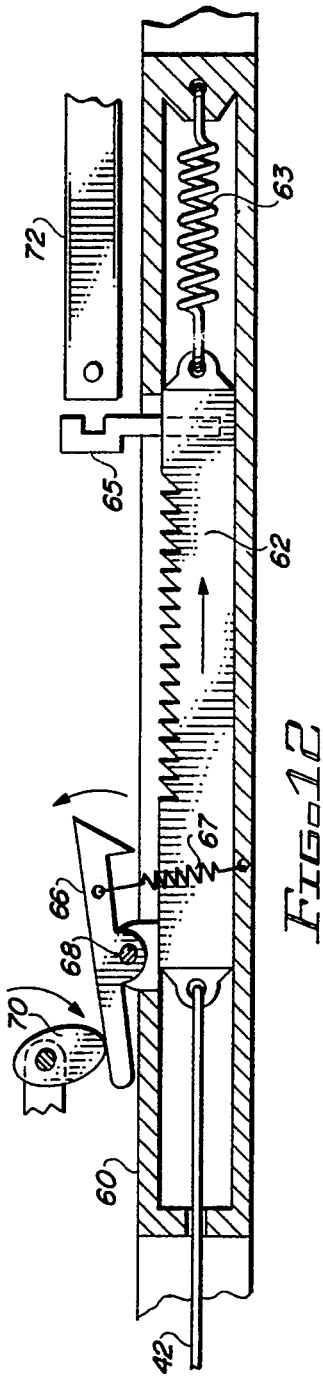

MULTIPLE MIRROR ASSEMBLY FOR SOLAR COLLECTOR

BACKGROUND

Multiple mirror concentrating solar collector assemblies are known for directing the rays from the sun to a common point by means of an array of mirrors. Typically, a large number of mirrors is used; and these mirrors are individually focused from a tracking apparatus onto a common point for utilization of the solar energy reflected by the mirrors onto that point. Large scale collector assemblies use the focused heat for a variety of purposes. Some operate a boiler for generating electricity. Other such assemblies are used in a hot water system for producing a source of hot water. The apparatus on which the mirrors are mounted operates to track the relative movement of the sun and the earth on a daily an annual cycle from east to west, and from north to south. Sophisticated equipment has been developed for performing this function to maximize the effectiveness of the collection of solar energy by the multiple mirror arrays. A typical solar collector of this type is disclosed in the U.S. Pat. No. 4,056,313 to Arbogast.

From time to time, it becomes necessary to refurbish or replace different ones of the individual mirrors of a concentrating solar collector. This usually is a relatively labor intensive, time consuming operation, because the mirrors are permanently attached to individual mounting points on the underlying apparatus. In some locations, it is desirable to remove the mirrors and store them for protection during extreme weather conditions, such as snow, hail, high winds and the like. The standard mountings for such mirrors often preclude ready removal and storage when such adverse weather conditions threaten, again, because of the large amount of time and labor required to effect the removal and replacement of the mirrors. As a consequence, particularly in situations where hail or heavy snow conditions exist, damage to the mirrors can occur, because of an inability to remove the mirrors in sufficient time to prevent such damage.

Instead of using glass mirrors, inexpensive mirrors comprised of a foam backing, such as styrofoam or the like coated with a reflective thin film surface made of Mylar or other suitable materials, have been developed. The lightweight mirrors permit less rugged support structures to be used, in contrast to the rugged support structures which must be employed with heavy glass mirrors. In addition, when such inexpensive mirrors are damaged, they can be recycled or discarded at relatively low cost. The attachment of such inexpensive, lightweight mirrors, however, to the individual mounting positions on the solar collector apparatus has been subject to the same disadvantages which occur with respect to glass mirrors, namely the attachments are time consuming to make; so that initial installation and any subsequent replacement of the mirrors is a labor intensive operation.

It is desirable to provide a heliostat mirror assembly which facilitates the removal and replacement of mirrors on the solar collector, and which is efficient in operation and easy to use.

SUMMARY OF THE INVENTION

Accordingly, it is an object of this invention to provide an improved mirror assembly for solar collectors.

It is another object of this invention to provide an improved mirror assembly using lightweight mirrors.

It is an additional object of this invention to provide an improved multiple mirror assembly for use with solar collectors, in which the mirrors are mounted in a carrying frame which permits the simultaneous installation or removal of an entire array of mirrors.

It is a further object of this invention to mount a plurality of mirrors, for use on a solar collector, in a frame by means of flexible cords, which position the mirrors over the various mounting positions in the apparatus, and in which the cords are tensioned and released to effect the removal and installation of the individual mirrors at the mounting positions on the collector assembly.

In accordance with a preferred embodiment of the invention, a multiple mirror solar collector has an array of mirrors arranged in rows and columns. Each of the mirrors is capable of being individually attached to an underlying support structure. A mirror frame is used to carry all of the mirrors on flexible cords attached to the mirror frame and extending through guides on each of the mirrors. The cord members are selectively tensioned to hold the mirrors in a common plane above the support structure, and are released to position the mirrors on the individual mounting positions of the support structure.

BRIEF DESCRIPTION OF THE DRAWINGS

FIG. 1 is a perspective view of a portion of a multiple mirror array for a concentrating solar collector in accordance with a preferred embodiment of the invention;

FIG. 2 is a top view of the embodiment of FIG. 1, illustrating the mirror arrangement;

FIG. 3 is a side view showing a detail of the operation of the embodiment of FIG. 1;

FIG. 4 is a bottom view of a portion of the embodiment shown in FIG. 1;

FIG. 5 is a detail of the manner of mounting an individual mirror of the type shown in FIGS. 1, 3 and 4 on a solar collector structure;

FIG. 6 is a bottom view of an alternative to the embodiment shown in FIG. 4;

FIG. 10 is a diagrammatic representation of the operation of the apparatus shown in FIG. 7; and FIGS. 11 and 12 illustrate details of the control box a portion of the embodiment shown in FIG. 10.

DETAILED DESCRIPTION

Figure 7:
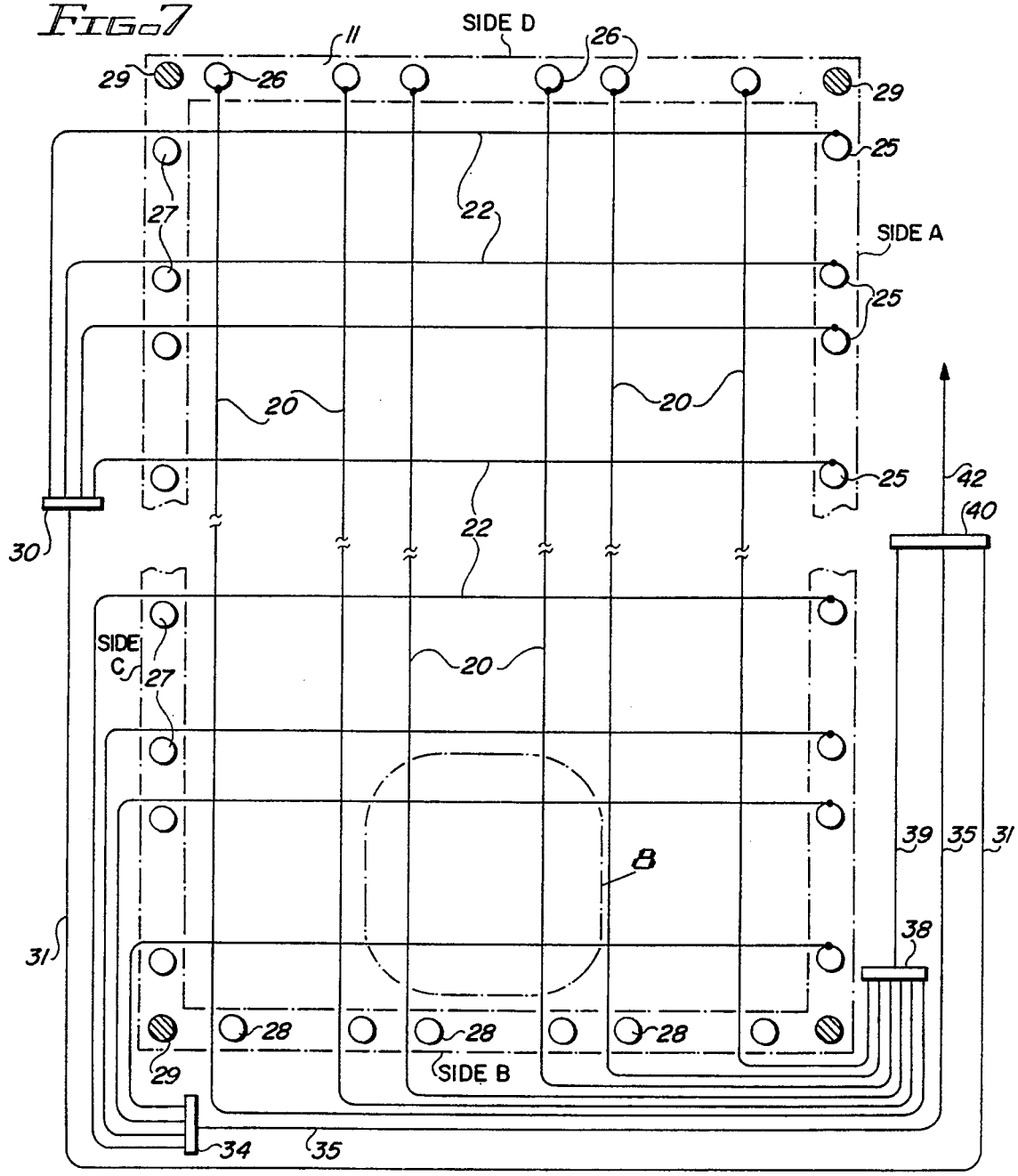
FIG. 7 is a diagrammatic representation of the operation of the embodiment shown in FIG. 1.

Reference now should be made to the drawings, in which the same reference numbers are used in the different figures to designate the same components. The mirror assembly, which is illustrated in the various figures of the drawings, is adapted for use with any number of different underlying concentrating solar collector mirror positioning frames or apparatus. A typical solar collector, with which the embodiment of this invention may be used, is the one disclosed in the above mentioned U.S. Pat. No. 4,056,313 to Arbogast. That patent discloses a mechanism for effectively tilting or positioning individual mirrors of a multiple mirror apparatus to focus those mirrors on a common point. As illustrated in such patent, mounting points or locations are provided for each of the individual mirrors. For the purposes of understanding the operation of this invention, the heliostat of Arbogast U.S. Pat. No. 4,056,313 may be considered to be typical of such assemblies.

As shown most clearly in FIGS. 1 and 2, a multiple mirror assembly, in accordance with a preferred embodiment of the invention, includes rows and columns of square mirrors 10. The mirrors 10 ideally are made of lightweight material, such as styrofoam or polyethylene foam. The upper surface, as shown in FIG. 1, is coated with a mirrored thin film acetate or polyester reflective surface. As a consequence, each of the individual mirror panels 10, which are approximately one square foot in size, is very lightweight.

The rows and columns of mirrors 10 are arranged in an open rectangular frame 11/12, which may be made of any suitable material, such as wood or aluminum or the like. The frame has a lower portion 11 and an upper portion 12, which are spaced apart by means of cylindrical guides or dowels 29 in each of the four corners, and 25, 26, 27 and 28 on the four sides. These guides are shown most clearly in FIGS. 1 and 7. As is apparent from an examination of FIG. 1, the lower and upper portions of the frame 11/12 are spaced apart; so that the space between them is open, providing access to the guides 25 through 29.

As illustrated in FIG. 7, transverse cords or stringers 22, preferably made of nylon or other suitable material, are attached at one end to the guides 25 between the upper and lower parts of the frame 12. These cords then slidably extend around the guides 27 on the opposite side of the frame, in two different groups connected to plates or termination members 30 and 34, respectively.

A similar arrangement of longitudinal cords or stringers 20 are attached at one end to the guides 26, as illustrated in FIG. 7. These cords then slidably pass around the guides 28 on the opposite end of the frame 11/12, and terminate in a common termination block or member 38. Each of the blocks 30, 34 and 38 are connected to a master block 40 by means of cords or stringers 31, 35 and 39, respectively, as seen most clearly in FIGS. 7 and 10.

Figure 8:
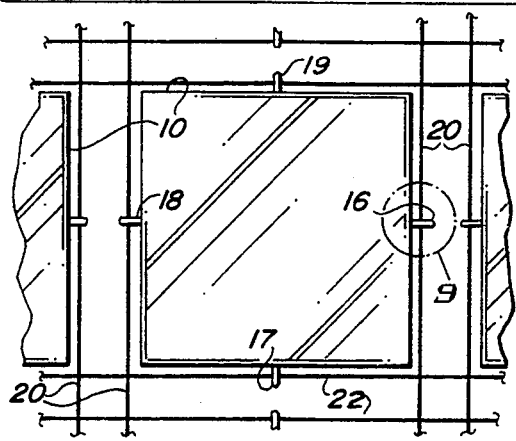
FIG. 8 is a detail of the portion circled as "8" in FIG. 7.
Figure 9:
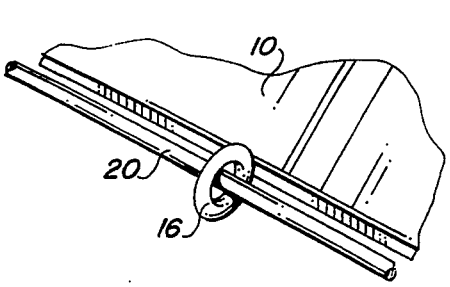
FIG. 9 is a detail of the portion circled as "9" in FIG. 8.

The lightweight mirror panels 10 are suspended on the transverse cords 22 and the longitudinal cords 20 in the frame 11/12 by means of eyelets 16, 17, 18 and 19 located, respectively, at the midpoints of each of the four sides of the mirror panels 10. This arrangement is most clearly shown in FIGS. 1, 4 and 8. The transverse cords 22, which are secured to the guides 25 at one end, pass through the eyelets 17 and 19 on opposite sides of each of the panels 10. As is readily apparent from an examination of FIG. 1, each spaced-apart pair of transverse cords 22 pass through the eyelets 17 and 19 of an entire row of three of the panels 10. Five such rows of panels 10 are illustrated in the arrangement of FIG. 2. Correspondingly, there are three pairs of columns of cords 20, which are attached to the pins 26 at one end. Each of these pairs of cords passes through the eyelets 16 and 18 on opposite sides of a column of panels 10; so that each of the panels 10 are supported on all four sides by two intersecting pairs of orthogonal cords 20 and 22.

As illustrated in FIG. 1, the cords or stringers 20 and 22 are illustrated in their taut position, which causes the mirrors to be "feathered" or pulled into a planar orientation (usually horizontal), where the mirror surfaces generally are parallel to the plane of the frame 11/12. In this configuration, the mirrors 10 and frame 11/12 may be stored (either vertically or horizontally) or moved from a solar collector support, or placed on a solar collector support, with all of the mirrors 10 held in the suspended position shown in FIGS. 2 and 8.

The frame 11/12 may be attached to the top of a concentrating solar collector frame of the type shown in the Arbogast U.S. Pat. No. 4,056,313 or other solar collectors by means of any suitable connections, such as bolts, clamps, latches and other means. The only requirement is that the frame 11/12 must overlie the underlying support surface, and that the orientation of the mirrors 10 is such that each of the mirrors is located properly above each mirror mounting position on the particular solar collector with which the mirror assembly is to be used.

As illustrated in FIG. 5, a feature of a typical underlying support member for one of the mirrors 10 is illustrated. The mirror support includes a support rod 55 having a mirror holding surface 56 on its upper end. The mirror holding surface 56 may be a flat, circular plate made of magnetic material, such as iron, or the plate may have one or more magnets attached to it. As illustrated in FIGS. 4 and 5, an array of three closely spaced magnets 50 is shown attached to the bottom of each of the mirrors 10. These magnets 50 then are magnetically attracted to the plate 56 when the mirror 10, located above the plate 56, is lowered by release of the tension in the cords or stringers 20 and 22 to permit the mirror 10 to drop downwardly onto the mounting plate 56 of the underlying mirror supporting apparatus. If magnets are used on the surface 56, the polarity of these magnets is selected to be opposite that of the magnets 50; so that the magnets on the mounting plate 56 attract the magnets 50 on the bottoms of each of the mirrors 10. A support rod 55 and plate 56 is located beneath each one of the mirrors 10.

When the tension in the cords or stringers 20 and 22 is released, the release preferably is effected relatively slowly. This causes the alignment of the mirrors 10 to remain as illustrated in FIGS. 1 and 2 as the mirrors drop down into place on the mounting plates 56 of each of the support rods 55 on the underlying assembly (not shown) to cause each of the mirrors 10 properly to be attached to the ends of the respective support plates 56 on the support assembly. Once the magnets 50 on the backs of the mirrors 10 engage the support plates 56 (or magnets located on these support plates), the mirrors are firmly held in place on the support plates in the manner shown in the side view of FIG. 3. In this position, the tilting of the rods 55 to position the mirrors 10 for operation of the solar collector may be effected to orient the mirrors 10 in various angular positions, such as the one shown in FIG. 3. As illustrated in FIG. 3, the cords or stringers 20 are in a relaxed position passing through the respective eyelets without applying any tension to any one of the sides of the mirror 10. Operation of the solar collector then is effected in a conventional manner.

FIG. 4 shows an alternative arrangement of magnets, which may be employed on a different type of mounting structure for a solar collector, if desired. A wider spacing of three magnets, such as the magnets 51 illustrated in dotted lines in FIG. 4, may be used. Also, if the underlying support structure is so made, four magnets 80 may be placed in the corner of each of the mirrors 10, as shown in FIG. 6. If an arrangement of this type is used, a reduced number of cords or stringers 20 and 22 may be employed, since only one stringer 20 and only one stringer 22 are required in each direction. The eyelets are arranged on the bottoms of the mirrors 10, as shown in FIG. 6, as an opposing pair of eyelets 76 and 78 for the cord 22 and another pair 77 and 79 for the cord 20.

At such time as the replacement of any individual mirror is desired, or whenever feathering of the mirrors 10 is required because of high wind conditions, or if the entire frame 11/12, along with all of the mirrors 10 of the multiple mirror array is to be removed, the cords or stringers 20 and 22 are tensioned to break the magnetic connection between the magnets 50 and the mounting plates 56 to pull the mirrors back into the position shown in FIG. 1 and in dotted lines in FIG. 3. A control mechanism 60 for accomplishing this purpose is illustrated in FIGS. 10, 11 and 12. As shown in FIGS. 11 and 12, the block 40, to which the cords 31, 35 and 39 are attached, is attached by means of the cord 42 to a control mechanism box 60. The control box 60 is shown in cross-sectional view in FIGS. 11 and 12; and in FIG. 11, it is illustrated in the released (non-tensioned) configuration. Thus, the cord 42 is fully extended out of the control box. A coil spring 63 is extended under tension, and is attached to one end of a ratchet plate 62, to which the end of the cord 42 is attached. The ratchet plate 62 is held in place by means of a detent 66 and a detent spring 67. This is the relaxed position for all of the cords 20 and 22, since the block 40 is moved to the left as shown in FIG. 10, and the blocks 30, 34 and 38 likewise so move. The mirrors 10 then are in the position shown in solid lines in FIG. 3 for operation with the solar collector.

If some condition should exist, such high winds, or it is desired to remove the frame 11/12 from the solar collector apparatus for any reason, a cam 70 is operated to lift the detent 66 out of engagement with the teeth on the Elate 62 by rocking the detent counterclockwise about a pivot 68. This allows the spring 63 to pull the plate 62 toward the right, as shown in FIG. 12. This tensions the cord 42 and all of the cords 31, 35 and 39, which in turn tension the cords 20 and 22 to pull the mirrors 10 into the feathered or flattened position shown in FIG. 1. In this position, the entire set of mirrors may be removed by removing the frame 11/12 from the solar collector. Or the mirrors simply may be left in their feathered position, as illustrated in FIG. 1, if this operation is being effected to minimize the potential for wind damage to the mirror array.

When the mirror array again is to be operated to attach each of the individual mirrors 10 to the supports 55, 56, the cam 70 is rotated to the position shown in FIG. 11 and a push-bar 72 is used to engage a lever 65 attached to the plate 62 to move the lever and plate to the left, as shown in FIG. 11, under the pressure or movement of the push-bar 72. A slot 73 is provided in the top of the housing to permit this movement of the lever 65 from the position shown in FIG. 12 to the one shown in FIG. 11.

The foregoing description of the preferred embodiment of the invention is to be considered as illustrative of the invention, and not as limiting. Various changes and modifications can be made. For example, the control box 60 and the mechanism shown in FIGS. 11 and 12 may be replaced by a variety of different types of apparatus. In the simplest form, the member 40 may be manually moved and the cord 42 secured by tying it around a suitable anchor member, such as a pin or the like. The number of mirrors which are shown in the array is shown purely for purposes of illustration; and arrangement of the mirrors in different numbers in the rows and columns may be effected in accordance with the particular apparatus with which the invention is to be used. The materials out of which the mirrors are made is not to be limited to the ones described, as various types of mirror materials and mirror structures may be employed without departing from the scope of the invention. Various other changes and modifications will occur to those skilled in the art, without departing from the true scope of the invention as defined in the appended claims.

I claim:

1. A mirror assembly for a multiple-mirror apparatus having an array of mirrors arranged in rows and columns, and each individually attached to an underlying support structure, said mirror assembly including in combination:
   a mirror frame for a support structure;
   a plurality of mirrors arranged in rows and columns in said mirror frame;
   guide means on each of said mirrors;
   flexible cord members attached to said mirror frame and extending through said guide means; and
   tensioning means for selectively tensioning said flexible cord members to hold said mirrors in a common plane in said mirror frame.

2. The combination according to claim 1 wherein said mirror frame is an open rectangular frame to position said rows and columns of said mirrors over corresponding support members on said support structure.

3. The combination according to claim 2 wherein said means for selectively tensioning said cord members also selectively releases said cord members to permit said mirrors to drop into predetermined positions on said support structure.

4. The combination according to claim 3 further including means for releasably attaching each of said mirrors in a predetermined position on said support structure when said cord members are released by said tensioning means.

5. The combination according to claim 4 wherein each of said mirrors has first and second sets of mutually perpendicular parallel edges, and said guide means for said flexible cord members are attached adjacent each of the edges of each of said plurality of mirrors.

6. The combination according to claim 5 wherein said mirrors are rectangular with four edges and said flexible cord members are arranged in at least two groups of mutually perpendicular cord members extending parallel to the edges of said mirrors in said rows and columns of mirrors.

7. The combination according to claim 6 wherein said guide means comprises an eyelet located substantially at the center of each of the four edges of each of said plurality of rectangular mirrors.

8. The combination according to claim 7 wherein said means for selectively attaching each of said mirrors to each of said support structure comprises magnetic means.

9. The combination according to claim 1 wherein each of said mirrors has first and second sets of mutually perpendicular parallel edges, and said guide means for said flexible cord members are attached adjacent each of the edges of each of said plurality of mirrors.

10. The combination according to claim 9 wherein said mirrors are rectangular with four edges and said flexible cord members are arranged in at least two groups of mutually perpendicular cord members extending parallel to the edges of said mirrors in said rows and columns of mirrors.

11. The combination according to claim 10 wherein said guide means comprises an eyelet located substantially at the center of each of the four edges of each of said plurality of rectangular mirrors.

12. The combination according to claim 1 wherein said means for selectively tensioning said cord members also selectively releases said cord members to permit said mirrors to drop into predetermined positions on said support structure.

13. The combination according to claim 12 further including means for releasably attaching each of said mirrors in a predetermined position on said support structure when said cord members are released by said tensioning means.

14. The combination according to claim 13 wherein said means for releaseably attaching each of said mirrors on said support structure comprises magnetic means.

15. The combination according to claim 1 further including means for releasably attaching each of said mirrors in a predetermined position on said support structure when said cord members ace released by said tensioning means.

16. The combination according to claim 15 wherein said means for releaseably attaching each of said mirrors to each of said support structure comprises magnetic means.

17. The combination according to claim 1 wherein said mirrors are rectangular with four edges and said flexible cord members are arranged in at least two groups of mutually perpendicular cord members extending parallel to the edges of said mirrors in said rows and columns of mirrors.

18. The combination according to claim 17 wherein said guide means comprises an eyelet located substantially at the center of each of the four edges of each of said plurality of rectangular mirrors.

* * * * *